United States Patent [19]
Nishiura et al.

[11] Patent Number: 5,335,064
[45] Date of Patent: * Aug. 2, 1994

[54] FIBER-OPTIC GYROSCOPE FOR MEASURING VELOCITY OF AN OBJECT

[75] Inventors: Yozo Nishiura; Yasuhiko Nishi, both of Osaka, Japan

[73] Assignee: Sumitomo Electric Industries, Ltd., Osaka, Japan

[ * ] Notice: The portion of the term of this patent subsequent to Sep. 14, 2010 has been disclaimed.

[21] Appl. No.: 911,612

[22] Filed: Jul. 10, 1992

[30] Foreign Application Priority Data

Jul. 12, 1991 [JP] Japan .................. 3-198534
Apr. 30, 1992 [JP] Japan .................. 4-139899

[51] Int. Cl.$^5$ .............................................. G01C 19/64
[52] U.S. Cl. ........................................ 356/350; 385/11
[58] Field of Search ...................... 356/350; 385/11

[56] References Cited

U.S. PATENT DOCUMENTS

| | | | |
|---|---|---|---|
| 4,572,608 | 2/1986 | Mochizuki et al. | 385/11 |
| 4,712,306 | 12/1987 | Cahill et al. | 356/350 |
| 5,245,407 | 9/1993 | Nishiura et al. | 356/350 |

FOREIGN PATENT DOCUMENTS

| | | |
|---|---|---|
| 0260885 | 3/1988 | European Pat. Off. . |
| 3115804 | 11/1982 | Fed. Rep. of Germany ...... 356/350 |
| 60-97304 | 5/1985 | Japan . |
| 4106416 | 4/1992 | Japan . |
| 4106417 | 4/1992 | Japan . |
| 4106420 | 4/1992 | Japan . |

OTHER PUBLICATIONS

K. Bohm et al, "Low-Drift Fibre Gyro Using a Superluminescent Diode", Electronics Letters, vol. 17, No. 10, p., 352 (1981).

K. Bohm et al, "Performance of Lyot Depolarizers with Birefringent Single-Mode Fibers", Journal of Lightwave Technology, vol. Lt-1, No. 1, Mar. 1983, p. 71.

Proceeding of 7th Meeting on Lightwave Sensing Technology "Lamipol and Optic Components" May 23–24, 1991.

Primary Examiner—Vincent P. McGraw
Attorney, Agent, or Firm—Cushman Darby & Cushman

[57] ABSTRACT

A fiber-optic gyroscope having a single mode fiber coil for sensing the rotation suffers from drift or fluctuation of scale factor of the output signals owing to spontaneous rotation of polarization of beams propagated in the fiber coil. Thus, two depolarizers are required in front of and at the back of the polarizer to avoid the fluctuation. The depolarizer of prior art consists of two birefringent materials twistedly connected with each other at an about 45° inclination angle between the principal axes of one and the principal axes of the other. A conventional fiber-type depolarizer has two polarization maintaining fibers connected together. A new, simplified depolarizer is proposed. The depolarizer is built by gluing a polarization maintaining fiber to an end of the polarizer with an about 45° inclination angle between the principal axes of the fiber and the principal axes of the polarizer. The depolarizer allows us to dispense with one polarization maintaining fiber and spare the operation for connecting fibers by once.

9 Claims, 10 Drawing Sheets

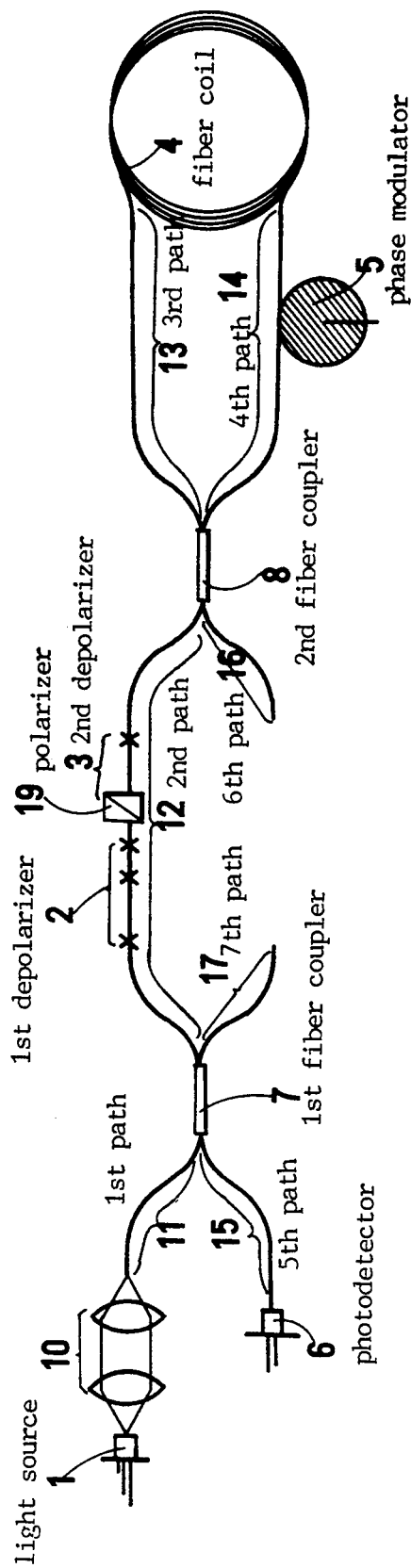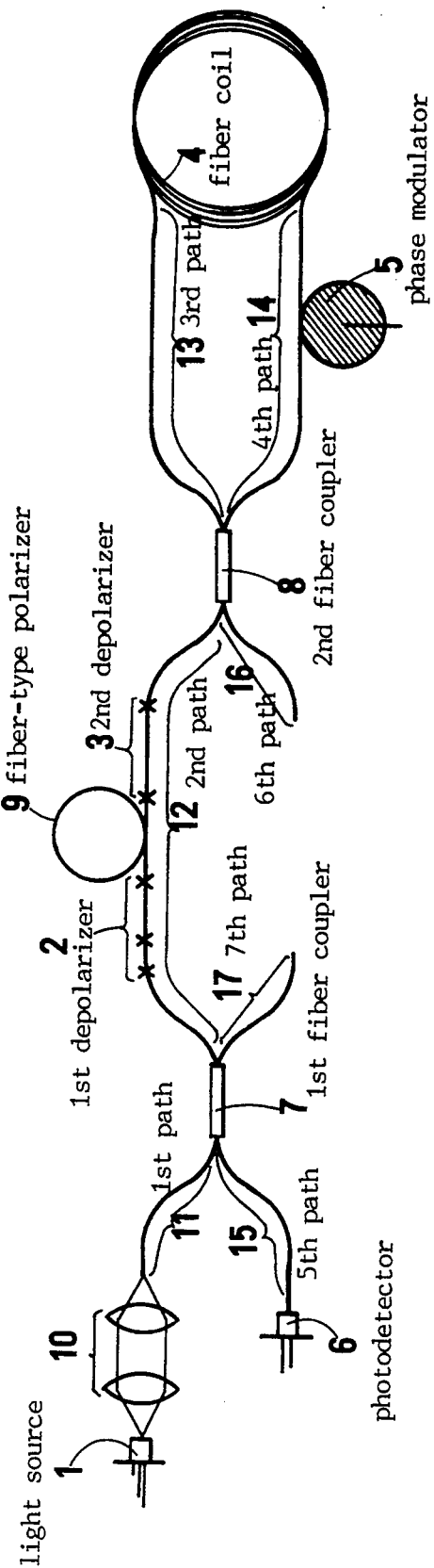

FIBER-OPTIC GYROSCOPE FOR MEASURING VELOCITY OF AN OBJECT

FIELD OF THE INVENTION

The invention relates to a fiber-optic gyroscope for measuring an angular velocity of a moving apparatus, e.g. an automobile, an airplane or a ship. Especially, this invention relates to a fiber-optic gyroscope mainly constructed by optical fibers.

BACKGROUND OF THE INVENTION

This application claims the priority of Japanese Patent Applications No. 139899/1992 filed Apr. 30, 1992 and No. 198534/1991 filed, Jul. 12, 1991, which are incorporated herein by reference.

A fiber-optic gyroscope obtains an angular velocity of a sensing coil by utilizing the property that the phase difference between a clockwise-propagated light beam and a counterclockwise-propagated light beam is in proportion to the coil angular velocity. Different modes of fiber-optic gyroscope are known owing to the method how to modulate the light beams; phase-modulating method, frequency modulation method and phase shift method, etc.

Since a fiber-optic gyroscope makes the clockwise-propagated light beam and counterclockwise-propagated light beam interfere each other, both light beams must have the same polarization planes at a detector. Difference of the polarization planes will reduce the power of the interference light beam in proportion to cosine of the angle between the different polarization planes. Furthermore, if the polarization planes are vertical each other, they cannot interfere any more.

The polarization planes must be arranged in the same direction at the detector. Since two degenerated light beams having different polarization planes are propagated in a single mode fiber with the same phase constant, the polarization planes are likely to rotate spontaneously.

To suppress the probable rotation of the polarization planes, an improvement of constructing the fiber coil with polarization maintaining fibers and of polarizing the signal light beam before it is divided into two partial light beams may be proposed. Since the polarization maintaining fiber suppresses the rotation of the polarization planes, it can make two partial light beams interfere on the same polarization plane.

Polarization maintaining fibers are not rotationally symmetric, but asymmetric in an angular direction. Asymmetry is obtained by inserting stress applying parts in a diametrical direction or by deforming cores into an elliptic section. Such asymmetry induces a difference of phase constants between two light beams with different polarization planes. Phase velocity will differ according to the polarization. The polarization maintaining fiber has of course birefringence. Thus, it is often called a birefringence fiber. In this description the polarization maintaining fiber will be used as a synonym of the birefringence fiber.

However, the polarization maintaining fiber is much more expensive than the ordinary single-mode fiber. Such a fiber-optic gyroscope which is fully constructed with the polarization maintaining fiber will be highly expensive. Practical significance is poor.

A fiber coil and most of the optical paths shall be preferably fabricated by ordinary single mode fibers. But ordinary single mode fibers have some problems to be solved. Although they are called single mode fibers, it means that a single phase constant has only a single mode. Actually, there are two modes with different polarization planes vertical to each other which have the same phase constant. Two modes with different polarization planes are ideally independent. But polarization planes may rotate owing to external stress or distortion, because the phase constants are the same. The same phase constants degenerate two modes. They cannot forbid the rotation of the polarization planes. The rotation of the polarization planes will mix two modes which would be ideally independent.

However, two modes have different fluctuations of the phase constants in microscopic scale in spite of the macroscopic equivalence of phase constants. Therefore, when two modes have been propagated by the same distance, effective optical path lengths are different. The difference of the effective optical path lengths will induce a fluctuation of the output of the photodetector.

Clockwise propagated light beam and counterclockwise propagated light beam must experience the same path length rigorously in a fiber-optic gyroscope. In microscopic scale, the fluctuation of the polarization would induce a fluctuation of an optical path length. In order to suppress the fluctuation of the optical path length, it shall be effective to fix the polarization plane to a certain direction by launching the light beam through a polarizer before being divided into clockwise propagated light beam and counterclockwise light beam. Such polarization allows only a single mode with a single polarization plane to pass through the single mode fiber. Since single mode beams propagated in a single mode fiber, the optical path lengths are absolutely the same. The situation would be the same as the polarization maintaining fiber mentioned before, if no rotation of polarization occurred. However, a single mode fiber cannot prevent the light beams from rotating polarization planes. Thus, the preparatory polarization by the polarizer is not sufficient to equalize the optical path lengths in any cases. Two light beams with linear polarization planes are propagated in a fiber coil and pass through the same polarizer in a reverse direction. Owing to a probable rotation of the polarization planes, the polarization planes of the beams are not necessarily coincident with the direction of the optical axis of the polarizer. The inclination angle between the optical axis of the polarizer and the polarization plane of the beam is denoted by $\Psi$. The amplitude of the beam passing through the polarizer in the reverse direction reduces in proportion to $\cos \Psi$. The inclination angles are not necessarily the same for the clockwise propagated beam and counterclockwise propagated beam. Furthermore the inclination angle would change owing to a temperature fluctuation. Since the linearly polarized beams often rotate the polarization planes, the output of the photodetector will fluctuate owing to the polarization rotation. Such a fluctuation of the output of the photodetector will hinder an exact measurement of angular velocity.

Therefore, K. Boehm et al. had proposed a single mode fiber-optic gyroscope having a depolarizer in the optical path besides a polarizer. A depolarizer is a device for depolarize arbitrary linearly polarized or elliptically polarized beams. Depolarized state means that polarization planes are distributed with equal probability into all directions. K. Boehm et al.; "Low-Drift Fiber Gyro Using Superluminescent Diode", ELECTRONICS LETTERS, vol. 17, No. 10, p 352 (1981).

FIG. 15 shows the structure of the fiber-optic gyroscope of Boehm. A light source (1) emits a light beam. The beam passes through a lens (21), a beam splitter (22), a polarizer (23) and a lens (24) and enters an end of an optical fiber (25). The optical system converges the light beam on a small fiber core. The beam is linearly polarized by the polarizer (23). Namely, a mode with a single polarization plane is introduced into the fiber. The fiber (25) is coupled to another fiber (27) by a coupler (26). The coupler (26) divides the beam into a clockwise propagated beam and a counterclockwise propagated beam. The clockwise propagated beam once goes out and passes through a lens (28), a depolarizer (29) and a lens (30). The beam converges on an end of the fiber (27) and is propagated in a fiber coil (4) clockwise. Then the clockwise beam passes through a phase modulator (5). The counterclockwise propagated beam is modulated first by the phase modulator (5) and is propagated in the fiber coil (4) counterclockwise. In brief a clockwise propagated beam and a counterclockwise propagated beam are denoted simply by a CW beam and a CCW beam from now on. The CCW beam passes through the depolarizer (29) at last. A depolarizer is an optical device for depolarizing arbitrary linear polarization or elliptical polarization into non-polarization in which polarization planes are distributed in all directions with equivalent probability. The function of a depolarizer is reverse to that of a polarizer. The depolarizer (29) shown in FIG. 15 is called a Lyot depolarizer. FIG. 16 demonstrates a schematic view of a Lyot depolarizer.

A Lyot depolarizer consists of two birefringent crystals coupled each other. Optical axes of two crystals are twisted by 45 degrees. The thicknesses of the crystals are 1:2 in proportion. The thickness of the crystal, is determined so as to keep a difference of optical path lengths between an ordinary ray and an extraordinary ray surpassing the coherent length of the light. FIG. 16 shows isolated crystals for demonstrating optical axes, but in practice, two crystals are glued together without clearance.

The function of a depolarizer will be briefly explained. A linearly polarized beam (a) enters a first birefringent crystal ($Q_1$) and is divided into two beams (b) and (c) whose polarization planes are in parallel with the optical axes of the birefringent crystal. One is an ordinary beam and the other is an extraordinary beam. The optical path difference L of two beams in the full length the crystal must be longer than the coherent length of the light. Of course the amplitudes of two beams in the crystal ($Q_1$) are different. Two independent beams enter a second birefringent crystal ($Q_2$) whose optical axes are inclined at 45 degrees to that of the first crystal ($Q_1$). Both beams (b) and (c) are in halves divided into ordinary beams (d) and (e) and extraordinary beams (f) and (g). The beam (d) and the beam (f) originated from (b) have the same amplitude. The beam (e) and the beam (g) originated from (c) have the same amplitude also. The polarization of the ordinary beams is designated by X-axis. The polarization of the extraordinary beams is designated by Y-axis. The total energy of the light beams with the polarization in parallel with X-axis is equal to a sum of the energy of the beams (d) and (e). Similarly the total energy of the light beams with the polarization in parallel with Y-axis is equal to a sum of the energy of the beams (f) and (g). The energy of the beams with X-polarization is equal to the energy of the beams with Y-polarization, because they are the same sums of halves of the same amounts. In this case, the reason why the total energy of the beams with the same polarization is given by the sum of energy is because the difference of optical paths of the beams with the same polarization is longer than the coherent length the light. The cross terms in the sum of the amplitudes of the different beams vanish in the expression of energy.

The amplitudes of the beams with X- and Y-polarizations are always the same. Thus, the energy of an arbitrary beam is also equal to that of a corresponding beam with the polarization vertical to the former one. Therefore, all beams with any polarization have the same amplitude in common. This state is a depolarized state. Arbitrary linearly-polarized beams are converted to a depolarized state. Thus arbitrary elliptically polarized beams can be also converted into a depolarized state.

Since the second birefringent crystal is twice as thick as the first one, the differences of the optical path lengths of ordinary beams and extraordinary beams regarding four beams (d), (e), (f) and (g) are the same. The differences are in any cases longer than the coherent length. The ratio of the thicknesses shall not necessarily be 1:2. Other ratios except 1:1 are also allowable. But in this case, every difference of the optical path lengths must be longer than the coherent length.

If we wish to use a thinner depolarizer, a light source with a shorter coherent length shall be required.

The fiber-optic gyroscope shown by FIG. 15 is constructed by single mode fibers, a polarizer and a depolarizer. The polarizer and the depolarizer have been made use of for solving the problem of the variation of the output induced by the rotation of the polarization plane. Besides Boehm, similar fiber-optic gyroscopes with a Lyot depolarizer inserted near a fiber coil have been proposed by other persons.

However, the fiber-optic gyroscope shown by FIG. 15 of Boehm was only a device for experiments constructed in a laboratory. It is not a practical device for practical use. Bulk optical parts have been used for a polarizer, a depolarizer and a beam splitter. Such parts are far bigger than fibers. Besides the bulky parts, lenses must be disposed before and behind the parts in order to transform the beams into wide, uniform plane waves. The big discrete parts will make a device too bulky to be used in a car, or another moving object.

A practical fiber-optic gyroscope shall require to reduce the size of polarizer, depolarizer and beam splitter to compact size at least smaller than a fiber coil.

A depolarizer and a polarizer can be made from optical fibers. The fact has been well known. A beam splitter can also be fabricated by optical fibers. Only fabricating all the optical parts by optical fibers shall allow us to make a practical fiber-optic gyroscope for the first time.

A fiber-made beam splitter can be fabricated by melting parts of two fibers, coupling them on sides and expanding the coupled part to enable them to couple evanescently. Such an evanescent coupling divides the light beam into two partial waves. A length of the coupling should be determined to divide the beam rigorously into halves to two branches of an output side.

A depolarizer can also be made from polarization maintaining fibers. FIG. 17 is a schematic view of the depolarizer constructed by two polarization maintaining fibers whose lengths are 1:2 in proportion. Two polarization maintaining fibers are spliced at ends with optical axes twisting together at about 45 degrees. Lengths of the fibers are determined so that the difference of the optical paths of the beams having different polarization planes in parallel with different optical axes is longer than the coherent length off the light. Black dots show the stress applying parts inserted in the fibers in diametric positions. The line connecting two paired dots is ones of the optical principal direction of the fibers. This axis is denoted by X-axis. The other principal axis, Y-axis is vertical to X-axis. The direction of propagation is Z-axis. X- and Y-axes off one fiber are twisted at 45 degrees to X- and Y-axes of the other fiber at the junction. Although FIG. 17 demonstrates dissembled fibers to show the optical axis and the twisting angle, two fibers are spliced at the junction.

A refractive index of the light beam with a polarization plane in parallel with X-axis ( in short, X-polarization )is denoted by $n_x$. A refractive index of the beam with Y-polarization is denoted by $n_y$. $L_1$ and $L_2$ are lengths of the fibers. The coherent length of the light source is denoted by h. The parameters require the following inequalities in order to make the fiber coupling a depolarizer;

$$|n_x-n_y|L_i > h (i=1,2) |n_x-n_y||L_2-L_1| > h \qquad (1)$$

As a fiber-made polarizer a coil of a polarization maintaining fiber is known. The coil is fabricated by winding a polarization maintaining fiber around a core several turns. Since a polarization maintaining fiber having birefringence is wound, the micro-bending loss differs regarding the directions of the polarization planes. Thus it allows a single beam with a certain direction of polarization to pass through. The other beam with the other direction of polarization vanishes. Thus the coil works as a polarizer. This is called a fiber-type polarizer.

A compact polarizer utilizing thin metal layers has been proposed. FIG. 18 demonstrates such a polarizer consisting of metal films and dielectric films deposited by turns. Metal films have a thicknesses of several nanometers to tens of nanometers. The dielectric films have a thickness of tens of nanometers to hundreds of nanometers. A light beam shall be introduced into the polarizer with a propagating line parallel with the planes of the films. For example, Japanese patent laying open No. 60-97304 (97304/85) has disclosed such a multilayered polarizer. A beam with a polarization plane parallel with the metal films will soon be attenuated. Only a beam with a polarization vertical to the film planes can pass through the device without loss. Thus the multilayered metal dielectric device acts as a polarizer. The metal dielectric multilayered polarizer can be so small that fibers can be spliced directly to the ends of it.

Of course other polarizer can be used. In the case of a discrete, bulky polarizer, two lenses are used to expand a beam to wide plane wave and to converge the wide wave to a core of a fiber as shown in FIG. 19.

The discrete optical parts shown in FIG. 15; a polarizer, a depolarizer and a beam splitter can be replaced by fiber-type devices, or compact devices. However, such replacement is still insufficient to fabricate a practical fiber-optic gyroscope. The problem of fluctuation of the output has not still fully resolved.

The light beam emitted from a light source is a linearly polarized beam. The polarization plane sometimes rotates by some reasons between a light source and a polarizer. It is difficult to harmonize the polarization of a beam with the optical axis of the polarizer at all times. External magnetic force or external tension would induce accidental rotation of polarization. Discrepancy between the polarization and the optical axis reduces the amplitude of the beam passing through the polarizer. In the case of a discrete polarizer as shown in FIG. 15, an initial adjustment of the axes can easily be carried out by maximizing the output of a photodetector by rotating the bulk, discrete polarizer. However, in the case of a fiber-type polarizer or a metal-dielectric multilayered polarizer, such an initial adjustment would be totally impossible, because no light will pass through the polarizer before it is coupled to fibers but no adjustment could be done after it has been coupled to fibers.

Even if such an initial adjustment of harmonizing the beam polarization with the optical axis of the polarizer is carried out, the polarization planes of beams will sometimes rotate by the variation of temperature or distortion of fibers, since an ordinary single mode fiber cannot prevent the polarization from rotating spontaneously. Rotation of the polarization planes will induce an increase or a decrease of the light beam passing through the polarizer. Therefore, the replacement of a discrete, bulky polarizer by a compact polarizer which can propagate a beam after it has been coupled to fibers would cause a new difficult problem of rotation of the polarization between a light source and a polarizer. No initial adjustment can easily be done. A post-adjustment is fully impossible, since the polarizer has tightly coupled to the fibers.

To solve the difficulty, the Inventors had devised a new compact type optic-fiber gyroscope having another depolarizer between a light source and a polarizer. The newly-added depolarizer can be installed either between a light source and a first fiber coupler or between a first fiber coupler and a polarizer. Such a fiber-optic gyroscope had been disclosed by;

1. Japanese patent laying open No. 2-225616(225616/90)
2. Japanese patent laying open No. 2-225617(225617/90)
3. Japanese patent laying open No. 2-225618(225618/90)

Invention 1 employed a depolarizer having two polarization maintaining fibers coupled by an about 45 degree twisting angle. The ratio of lengths of fibers was 1:2. The length of the shorter fiber was determined so that the difference of effective optical paths between an ordinary beam and an extraordinary beam ( optical path difference by birefringence, in short) is longer than the coherent length of the light source. Such a depolarizer was well-known and equivalent to the depolarizer demonstrated in FIG. 17.

Invention 2 substantially constructed an effective depolarizer near a light source by positioning a polarization maintaining fiber in front of the light source with the optical axis twisted at about 45 degrees to the polarization of the light emitted from the source. Invention 2 dispensed with another polarization maintaining fiber by making use of the twist between the light source and the fiber.

Invention 3 also substantially constructed an effective depolarizer by positioning a birefringent crystal in front of a light source with the optical axis twisted at about 45 degrees to the polarization of the light emitted from the source. Similarly to invention 1, the polarization of the light source and the birefringence of the crystal constituted an effective depolarizer.

The Inventors believe that another depolarizer should be inserted between a light source and a polarizer, when a single mode fiber exists between a light source and a polarizer. Inventions 1, 2 and 3 were based upon the belief. Such a fiber-optic gyroscope was a novel device, because no prior gyroscope contained two depolarizers.

However, invention 2 and invention 3 required a difficult adjustment of optical axes of fibers or birefringent crystals to a polarization plane of a beam emitted from a source. Invention 1 relied upon an independent depolarizer with two polarization maintaining fibers coupled together with optical axes twisted at about 45 degrees. The fiber-type depolarizer is a simple, reliable depolarizer. However, it required many junction operations; a junction of a single mode fiber to a depolarizer, a junction of a polarizer to a depolarizer and junction between two polarization maintaining fibers; at least three junction operations were required.

Such a problem of junction operations accompanies also another depolarizer coupled to an end of a fiber coil besides the depolarizer before the polarizer. Boehm had proposed a depolarizer utilizing two birefringent crystals as shown in FIG. 15. The crystal depolarizer can easily be replaced by a fiber-type depolarizer having two polarization maintaining fibers. The replacement never alleviates the time of junction operations, because a fiber-type depolarizer requires three junctions, i.e. two junctions between an ordinary single mode fiber and a polarization maintaining fiber and one junction between two polarization maintaining fibers. Especially, the junction operation between two polarization maintaining fibers is very difficult, because the optical axes must be twisted at 45 degrees precisely.

However, junction operations can be simplified. Consideration on the function of a depolarizer allows us to simplify the structure of a depolarizer. One purpose of this invention is to provide a fiber-optic gyroscope having simplified depolarizers. Another purpose of this invention is to provide a fiber-optic gyroscope which enjoys low parts cost and low assembly cost by using simplified depolarizers.

SUMMARY OF THE INVENTION

A first fiber-optic gyroscope of this invention is a fiber-optic gyroscope for obtaining an angular velocity of a fiber coil from a phase difference between a clockwise propagated beam and a counterclockwise propagated beam, comprising a light source for emitting a quasi-monochromatic Alight beam, a fiber coil fabricated by winding many times a single mode fiber around a spool, a photodetector for making the clockwise propagated beam and the counterclockwise propagated beam interfere each other and for detecting the intensity of an interference beam, a first coupler for coupling a first fiber path leading to the light source and a fifth fiber path leading to the photodetector with a second fiber path, a second coupler for coupling both ends of the fiber coil with the second fiber path, a polarizer mounted in the second fiber path, a first depolarizer disposed before the polarizer in the second fiber path, a second depolarizer disposed either at one end of the fiber coil or between the second coupler and the polarizer in the second fiber path, wherein the first depolarizer consists of a polarization maintaining fiber in which difference of optical paths between two light beams with polarization planes parallel with different optical axes of the fiber is longer than a coherent length of the light source, the polarization maintaining fiber being connected at an about 45 degree inclination angle to a front end of the polarizer.

A second fiber-optic gyroscope of this invention is a fiber-optic gyroscope for obtaining an angular velocity of a fiber coil from a phase difference between a clockwise propagated beam and a counterclockwise propagated beam, comprising a light source for emitting a quasi-monochromatic light beam, a fiber coil fabricated by winding many times a single mode fiber around a spool, a photodetector for making the clockwise propagated beam and the counterclockwise propagated beam interfere each other and for detecting the intensity of an interference beam, a first coupler for coupling a first fiber path leading to the light source and a fifth fiber path leading to the photodetector with a second fiber path, a second coupler for coupling both ends of the fiber coil with the second fiber path, a polarizer mounted in the second fiber path, a first depolarizer disposed before the polarizer in the second fiber path, a second depolarizer disposed between the second coupler and the polarizer in the second fiber path, wherein the second depolarizer consists of a polarization maintaining fiber in which difference of optical paths between two light beams with polarization planes parallel with different optical axes of the fiber is longer than a coherent length of the light source, the polarization maintaining fiber being connected at an about 45 degree inclination angle to a rear end of the polarizer.

A third fiber-optic gyroscope of this invention is a fiber-optic gyroscope for obtaining an angular velocity of a fiber coil from a phase difference between a clockwise propagated beam and a counterclockwise propagated beam, comprising a light source for emitting a quasi-monochromatic light beam, a fiber coil fabricated by winding many times a single mode fiber around a spool, a photodetector for making the clockwise propagated beam and the counterclockwise propagated beam interfere together and for detecting the intensity of an interference beam, a first coupler for coupling a first fiber path leading to the light source and a fifth fiber path leading to the photodetector with a second fiber path, a second coupler for coupling both ends of the fiber coil with the second fiber path, a polarizer mounted in the second fiber path, a first depolarizer disposed before the polarizer in the second fiber path, a second depolarizer disposed after the polarizer in the second fiber path, wherein the first depolarizer consists of a polarization maintaining fiber in which difference of optical paths between two light beams with polarization planes parallel with different optical axes of the fiber is longer than a coherent length of the light source, the polarization maintaining fiber being connected at an about 45 degree inclination angle to a front end of the polarizer, and the second depolarizer consists of a polarization maintaining fiber in which difference of optical paths between two light beams with polarization planes parallel with different optical axes of the fiber is longer than a coherent length of the light source, the polarization maintaining fiber being connected at an about 45 degree inclination angle to a rear end of the polarizer.

Functions of the invention are now explained. This invention constructs a depolarizer not with two polarization maintaining fibers but with one polarization maintaining fiber which is coupled to an incident plane of a polarizer with an about 45 degree twisting angle.

This is a novel feature of this invention. It enables us to dispense with one polarization maintaining fiber. An ordinary fiber-type depolarizer requires two polarization maintaining fibers with a 1 m to 2 m length. A polarization maintaining fiber is an expensive fiber, because it contains stress applying parts, etc. This invention saves us about one meter of polarization maintaining fiber. Furthermore, the number of splicing points of fibers is reduced by one. Splicing is a difficult operation taking much time, because the fibers must be spliced at a 45 degree twisting angle exactly. This invention saves such a costly operation. This invention enables us to reduce the material cost and the assembly cost to a considerable extent.

In short, the first invention builds a depolarizer by splicing a polarization maintaining fiber to a front end of a polarizer with an about 45 degree twisting angle between the polarization of the polarizer and the optical principal axis of the fiber. Namely a first depolarizer is replaced by a simplified depolarizer.

The second invention builds a depolarizer by splicing a polarization maintaining fiber to a rear end of a polarizer with an about 45 degree twisting angle between the polarization of the polarizer and the optical principal axis of the fiber. A second depolarizer is replaced by a simplified one.

The third invention builds two depolarizers by splicing two polarization maintaining fibers to a front end and to a rear end of a polarizer with an about 45 degree twisting angle between the polarization of the polarizer and the optical axes of the fibers. A first and second depolarizers are replaced by simplified ones.

Namely, according to the idea of the Inventors, two depolarizers before and behind a polarizer should be disposed. One of them or all of them are replaced by simplified, coupled-type depolarizers which consist of a polarization maintaining fiber coupled to a face of a polarizer at an about 45 degree inclination angle between the polarization of the polarizer and the optical principal axis of the fiber.

Then the question why a polarization maintaining fiber and a polarizer itself allow us to build a depolarizer will be explained now. This invention is surely based upon the equivalence of the coupled-type depolarizer to an ordinary fiber-type or a birefringent crystal-type depolarizer which utilizes two birefringent parts in series. Saving of one fiber features this invention.

Before explaining the saving, the principle of depolarizer will be clarified by referring to FIG. 16 or FIG. 17. A linearly-polarized beam enters a First birefringent material $Q_1$ or A. An inclination angle between the polarization plane of the beam and the optical axis of the first birefringent material is denoted by $\Phi$. X-component of the beam ( X-axis is the optical principal axis ) is in proportion to cos $\Phi$. Y-component of the beam is in proportion to sin $\Phi$. Partial beams are propagated in the birefringent material. An optical path difference is a product of the length of the material and the difference between the refractive induced X-polarization beam and Y-polarization beam. The optical path difference is denoted by L. $L=|n_x-n_y|L_1$. $L_1$ is a length of the material, $n_x$ is a refractive index of X-polarization and $n_y$, is a refractive index of Y-polarization beam. Since the difference L is longer than the coherent length light source, two beams with different polarization planes do not interfere each other. The beams are denoted by (b) and (c). Beam (b) has X-polarization. Beam (c) has Y-polarization. The incident beam is denoted by (a).

Beams (a) and (b) enter a second birefringent material $Q_2$. Optical principal axes of the second one incline at an inclination angle to the optical principal angle of the first one. Thus X-component of the light beams at the rear end of the second material comes from a product (d) of X-component of $Q_1$ multiplied by cos $\Theta$ and another product (e) of Y-component (c) of $Q_1$ multiplied by sin $\Theta$. The product (d) is in proportion to cos $\Theta$ cos $\Phi$ and the product (e) is in proportion to $-\sin \Theta \sin \Phi$. Other coefficients, e.g. power of the light source, quantum efficiency of the photodetector are in common in all the beams. The intensity ($P_x$) of the beams of X-polarization is obtained by calculating square of the sum of components (d) and (e). However two components (d) and (e) do not interfere, because the optical path difference is longer than the coherent length of the light. A cross term in the square vanishes. The intensity ($P_x$) is only a sum of the intensities of the components. Hence $$P_x = (\cos \Theta \cos \Phi)^2 + (\sin \Phi \sin \Theta)^2 \quad (2)$$

Similarly the intensity ($P_y$) of Y-component $Q_2$ is a sum of a product (f) of X-component of $Q_1$ multiplied by sin $\Theta$ and a product (g) of Y-component of $Q_1$ multiplied by cos $\Phi$. The product (f) is in proportion to (cos $\Phi$ sin $\Theta$). The product (g) is in proportion to (sin $\Phi$ cos $\Theta$). The intensity of Y-component is given by a square of the sum of components (f) and (g). The coherent length of the light source is shorter than the optical path difference between (g) and (f). A cross term in the square vanishes also. The intensity ($P_y$) is given by $$P_y = (\cos \Phi \sin \Theta)^2 + (\sin \Phi \cos \Theta)^2 \quad (3)$$

If the inclination angle of the principal axes of two birefringent materials $Q_1$ and $Q_2$ is 45 degrees ($\Theta = 45$). The intensities $P_x$ and $P_y$ are simplified as $$P_X = (\sin^2 \Phi + \cos^2 \Phi)/2 = \tfrac{1}{2} \quad (4)$$

$$P_Y = (\sin^2 \Phi + \cos^2 \Phi)/2 = \tfrac{1}{2} \quad (5)$$

Both intensities of X-component and Y-component are always equal ($P_X$- $P_Y$) regardless of the initial inclination angle of the polarization. The power of the initial beam is exactly divided into $P_X$ and $P_Y$. Such a division in half is now called equipartition. Only $\Theta = 45$ degrees gives us the equipartition of X- and Y-components. Eqs. (2) and (3) clearly show the equipartition requires $\Theta = 45$ degrees. Any other degrees cannot satisfy the condition for equipartition, because any degrees except 45 degrees give different weights upon sin $\Theta$ and cos $\Theta$, and the sum of the squares is not equal to 1.

Under the equipartition, power of beams with polarization in any directions has a common power. A power W of a linearly-polarized beam whose polarization plane inclines at an angle $\Psi$ to X-axis is obtained by a linear combination of $P_X$ and $P_Y$ with coefficients $\cos^2 \Psi$ and $\sin^2 \Psi$. Namely $$W = P_X \cos^2 \Psi + P_Y \sin^2 \Psi = \tfrac{1}{2} \quad (6)$$

This equation means that the power of a linearly-polarized beam with polarization in any direction is always constant. The power of beams is independent of the polarization. This means that the beams are not polarized. This state is called depolarized. This result is always valid regardless of the polarization of the incident beam.

The above explanation is based on the assumption that an initial beam is a linearly-polarized beam. But any elliptically-polarized beam is also depolarized at any instance, because any beams with any polarization become depolarized. Thus, any elliptically- or circularly-polarized beams can be also depolarized at any instance. In general, any beams with any types polarization are polarized in the birefringent materials $Q_1$ and $Q_2$.

In general, a depolarizer requires vanishing of a cross term in the equation of power and equipartition of power into X-component and Y-component. Vanishing of a cross term derives from the optical path difference longer than the coherent length of the light. Equipartition, i.e. power of the beam with X-polarization being equal to that of the beam with Y-polarization, is based upon the fact that the optical axes of two birefringent materials meet at an about 45 twisting angle with each other.

The above explanation correctly corresponds to a depolarizer having two birefringent crystals $Q_1$ and $Q_2$ glued together as shown in FIG. 16. FIG. 17 demonstrates another depolarizer with two polarization maintaining fibers spliced at an about 45 degree twisting angle with optical principal axes instead of birefringent crystals. The function of the fiber-type depolarizer is the same as the crystal-type depolarizer as shown in FIG. 16. In the fiber-type depolarizer, the birefringent materials $Q_1$ and $Q_2$ are replaced by polarization maintaining fibers A and B. In the depolarizer, $Q_1 = A$ and $Q_2 = A$ from the standpoint of function. The principle of depolarizer has been explained so far.

in order to facilitate the understanding of this invention, an alteration of eliminating a second birefringent material $Q_2$ and connecting a birefringent material Q to a polarizer directly will be now considered. "Directly" means that no intermediate medium exists between the birefringent material Q and the polarizer. In the case, X-axis is assigned to the principal axis of the polarizer. The single birefringent material Q has a optical principal axis twisting at 45 degrees to that of the polarizer. The power $H_x$ of beams having X-polarization at the rear end of the birefringent material Q is, $$H_x = (\cos \Theta \cos \Phi)^2 + (\sin \Phi \sin \Theta)^2 \quad (7)$$

This is derived in a manner like $P_x$ of Eq. (4). Since $\Theta$ is 45 degrees, $$H_x = \tfrac{1}{2} \quad (8)$$

This equation is important. This means that the power $H_x$ of the beam of X-polarization is exactly one half of the initial power at the front end of the polarizer. Namely, regardless of the initial polarization, half of the power enters the polarizer with X-polarization. The polarizer propagates without loss a beam with a polarization plane parallel with X-direction and intercepts a beam with a polarization plane with Y-direction. Thus, the power of the beam which can pass through the polarizer is exactly half of the initial power without reference to the initial polarization. If the polarizer is so perfect that a beam with X-polarization spreads without loss through the polarizer, the power of the beam which has passed through it is neither more than half nor less than half of the initial power. It is exactly half. This property is certainly the same as a couple of a polarizer and a depolarizer. Therefore, a couple of a polarizer and a depolarizer can surely be replaced by polarizer and a single birefringent material coupled at an inclination angle of 45 degrees to the polarizer directly. The latter is an equivalent of the former.

The inventors think that people have vaguely thought Eq.(2) to Eq.(5) were valid only at the rear end of $Q_2$, and $Q_2$ was indispensable in order to confirm these equations. However, a deliberation teaches us that the equations are not only valid at a rear end but also at a front end of $Q_2$. The validity of Eq. (2) to Eq. (5) is irrelevant to the thickness of $Q_2$.

Instead of the fact of passing through $Q_2$, what is important is an exact division in half at the front end of $Q_2$, because the principal axes are twisting at an about 45 degree inclination angle. The division in half requires only an optical part whose optical axis inclines at 45 degrees to the optical axis of $Q_1$. The optical part must be provided with an optical principal axis. By the way, a polarizer is a part having an optical principal axis. Therefore, when a birefringent material is accompanied directly by a polarizer, Eq. (2) to Eq. (5) hold in front of the polarizer.

Then why does a conventional depolarizer required $Q_2$? Such a question must be answered before utilizing a newly-proposed depolarizer instead of a conventional one. Only a role of $Q_2$ is to provide the optical path with a difference between X-polarization beams and Y-polarization beams which is longer than the coherent length of the light in order to avoid interference of X- and Y-polarization beams. The role is now called uninterference. In a conventional depolarizer, a second birefringent material $Q_2$ plays a role of uninterference. $Q_2$ has a function of dividing a beam into halves. But such a division in half (equipartition function) derives From the twisting angle of 45 degrees of the optical axes. Thus, the inherent function of $Q_2$ is the uninterference in the conventional depolarizer.

When a depolarizer was accompanied directly by a polarizer, it can do without the function of uninterference, because only beams with X-polarization can pass through the polarizer.

The depolarizer demonstrated in FIG. 16 required $Q_2$ for uninterference between X-components (d) and (e) and Y-components (f) and (g). $Q_2$ has no other role except uninterference. If a polarizer accompanies $Q_1$, components (f) and (g) vanish, because they have a polarization plane perpendicular to the axis of the polarizer. In this case, uninterference becomes unnecessary, because components (f) and (g) with Y-polarization do not exist.

In short, only a direct coupling of a polarizer to $Q_1$ allows us to do without $Q_2$ to build a depolarizer. This invention makes use of such a disposition. If a depolarizer is accompanied by a single mode fiber, $Q_2$ is indispensable, since the rotation of polarization planes may occur in the single mode fiber between the depolarizer and the polarizer.

A profound deliberation of a depolarizer has allowed us to invent a depolarizer. In short, only a direct coupling of a polarizer to $Q_1$ can spare us $Q_2$. If a single mode fiber accompanies a depolarizer built by $Q_1$ and $Q_2$ and a polarizer is coupled to the single mode fiber, $Q_2$ is indispensable for the depolarizer, because such a disposition would induce the rotation of polarization planes which would mix Y-components (f) and (g) with X-components (d) and (e). This invention is briefly characterized by coupling a single birefringent material to a polarizer at an inclination angle of about 45 degrees in order to play a role of a polarizer plus a depolarizer. A conventional depolarizer consists of two birefringent materials. A new depolarizer of this invention is not built by a single birefringent material, but by a single birefringent material directly coupled to a polarizer. $Q_2$ can be spared by a direct coupling of $Q_1$ to a polarizer.

Such a function is bilateral. The above explanation relates to a light beam spreading from $Q_1$ to a polarizer. What occurs upon a light beam spreading from a polarizer to $Q_1$? The situation to the beam is more simple. A beam which has passed through a polarizer is linearly-polarized to the direction of the axis regardless the initial polarization. The optical principal axis of $Q_1$ inclines at 45 degrees to the polarization. Therefore, a partial beam with X-polarization has a half power of the initial beam and another partial beam with Y-polarization has another half power of the initial beam exactly. The equipartition is realized by the inclination angle of 45 degrees. Since beams with arbitrary polarization can be represented by a linear combination of the elementary beams with X- and Y-polarizations with weights in proportion to cosine of the angles between X-axis or Y-axis and the polarization, the intensity of the beams is always the same as that of the beam of X-polarization or Y-polarization. Since the power the beams of any polarization has the same power, the state of the light beams is depolarized.

Since the function of the newly-proposed depolarizer is bilateral, a birefringent material can be coupled either to a front end, a rear end or both ends of a polarizer.

BRIEF DESCRIPTION OF THE DRAWINGS

FIG. 7 is a schematic view of an embodiment of a fiber-optic gyroscope of a second invention.

FIG. 9 is a schematic view of a fiber-optic gyroscope utilizing a fiber-type polarizer as an embodiment of a second invention.

DETAILED DESCRIPTION OF EMBODIMENTS

EMBODIMENT ①

Figure 1:
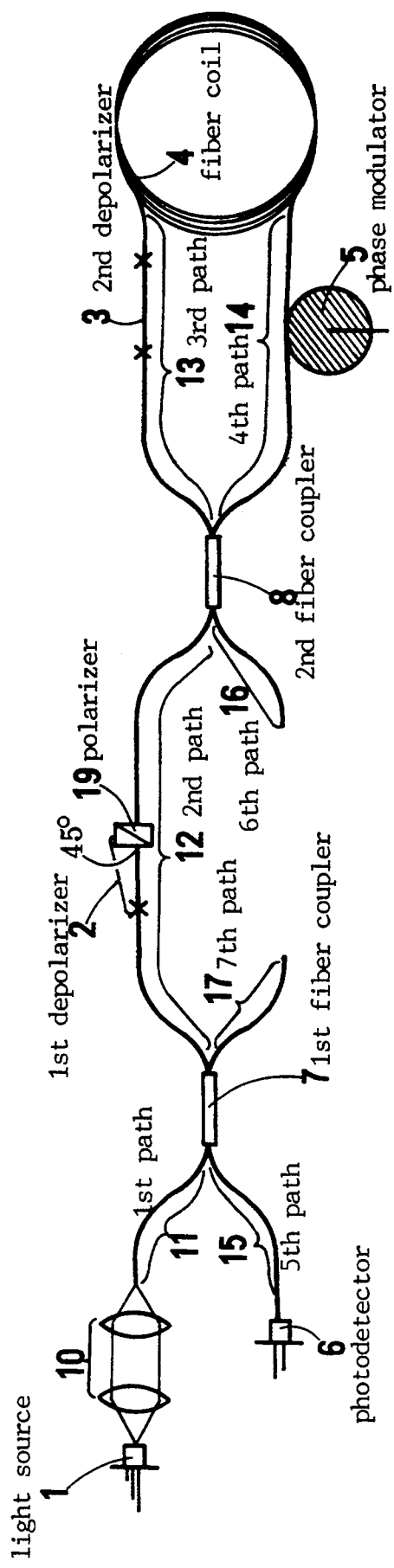
FIG. 1 is a schematic view of a first embodiment of a fiber-optic gyroscope of this invention.

An embodiment of a first invention will be explained by making reference to FIG. 1. This embodiment couples a polarization maintaining fiber in front of a polarizer. Almost all optical paths are built of optical fibers. The paths are mainly constructed by ordinary single mode fibers but some portions are made of polarization maintaining fibers.

The fiber-optic gyroscope comprises a light source (1), a first depolarizer (2), a second depolarizer (3), a fiber coil (4), a phase modulator (5), a photodetector (6), a first fiber coupler (7), a second fiber coupler (8) and a polarizer (19). These parts are connected each other by fibers. In general, the polarizer (19) can be any types of polarizer, e.g. polarization prism, metal-dielectric multilayer, or fiber-type polarizer. In practice, this invention can be applied to any types of fiber-optic gyroscopes with any types of polarizers.

Figure 15:
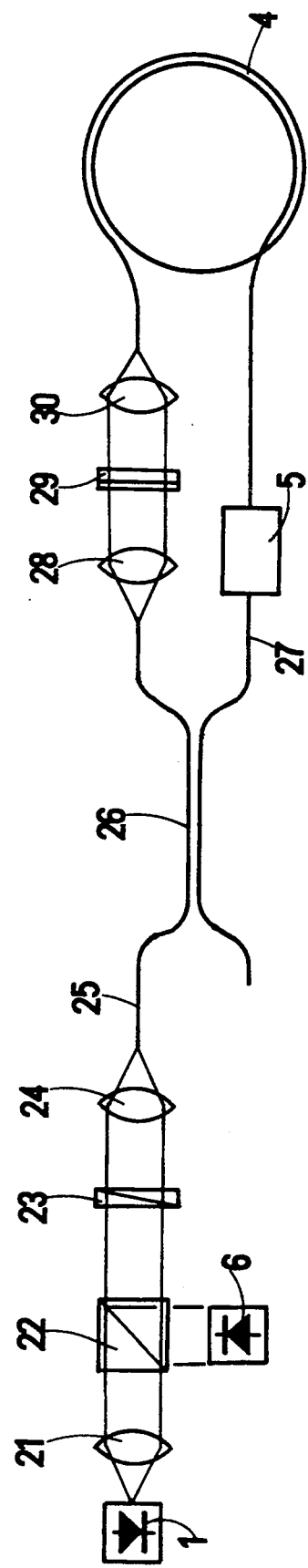
FIG. 15 is a schematic view of a fiber-optic gyroscope proposed by Boehm, et al.
Figure 16:
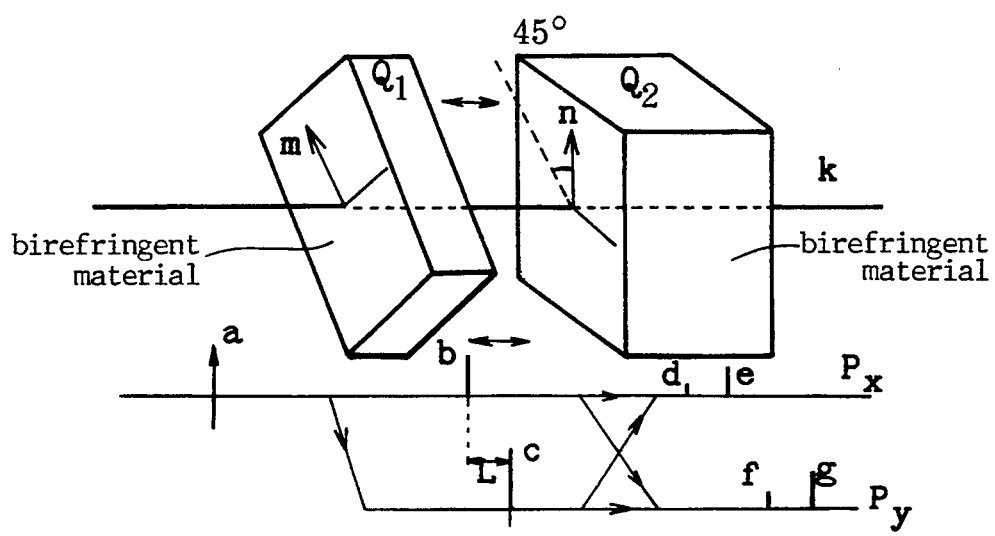
FIG. 16 is a disassembled view of a depolarizer produced by gluing two birefringent materials in series.
Figure 17:
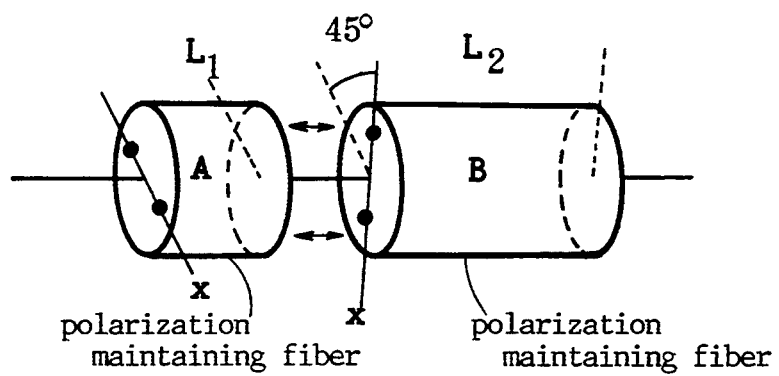
FIG. 17 is a disassembled view of a depolarizer produced by gluing two polarization maintaining fibers with polarization planes inclining at 45° in series.
Figure 18:
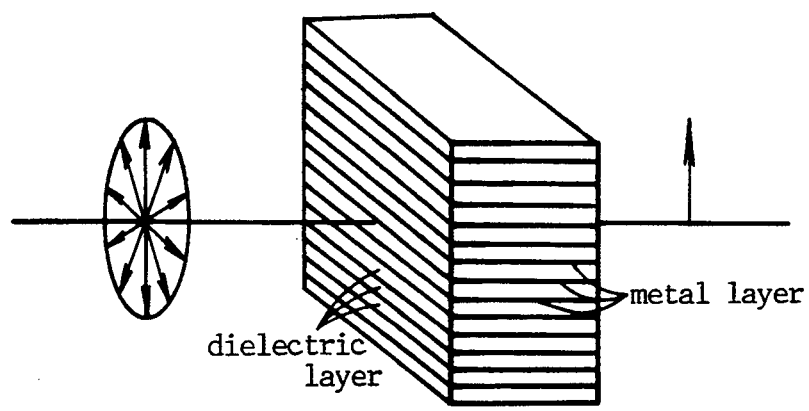
FIG. 18 is a schematic view of a polarizer produced by multilayering metal films and dielectric films by turns.
Figure 19:
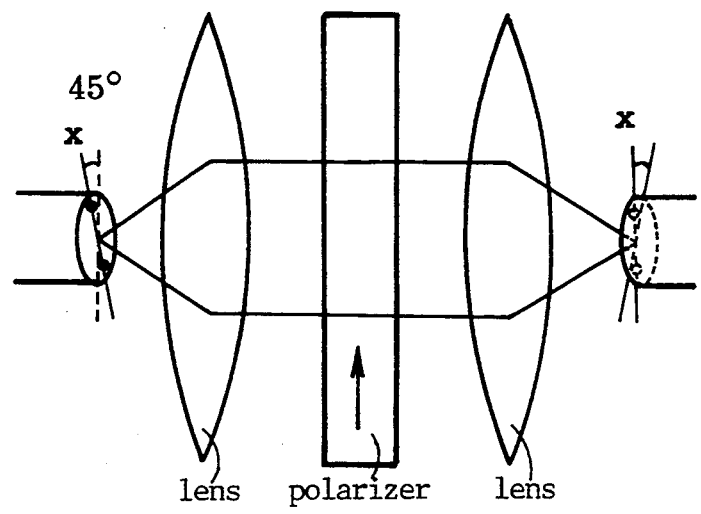
FIG. 19 is a view of a coupling between a polarizer and a polarization maintaining fiber demonstrating a use of lenses for making a wide plane wave in the case of a large polarizer.

A light source emits a quasi-monochromatic light beam. A laser diode or a superluminescent diode can be employed as a light source. The coherent length must be short enough. Depolarizers (2) and (3) are parts For depolarizing linearly- or elliptically-polarized beams. Interposing a (second) depolarizer (3) between a fiber coupler and a fiber coil has been known in the skilled as demonstrated also in FIG. 15 of the gyroscope proposed by Boehm. This invention interposes a (first) depolarizer (2) between the first fiber coupler (7) and the polarizer (19). Here the structure of the first depolarizer (2) is novel. The second depolarizer (3) is an ordinary one which consists of two polarization maintaining fibers (A) and (B) coaxially coupled together with optical principal axes twisting at 45 degrees. The lengths of the polarization maintaining fibers are determined by the condition that a difference of optical paths of the beams with different polarization planes perpendicular together should be longer than the coherent length of the light. The ratio of two optical fibers is for example 2:1. The requirement must hold with regard to the shorter fiber and to the difference of fibers. Inequality (1) clearly demonstrates the requirements. Two polarization maintaining fibers are spliced coaxially with a 45 degree inclination angle between optical axes of two fibers. Both ends of the depolarizer are spliced to ends of a single mode fiber of the fiber coil. Junctions are denoted by "X" in the figures.

Figure 3:
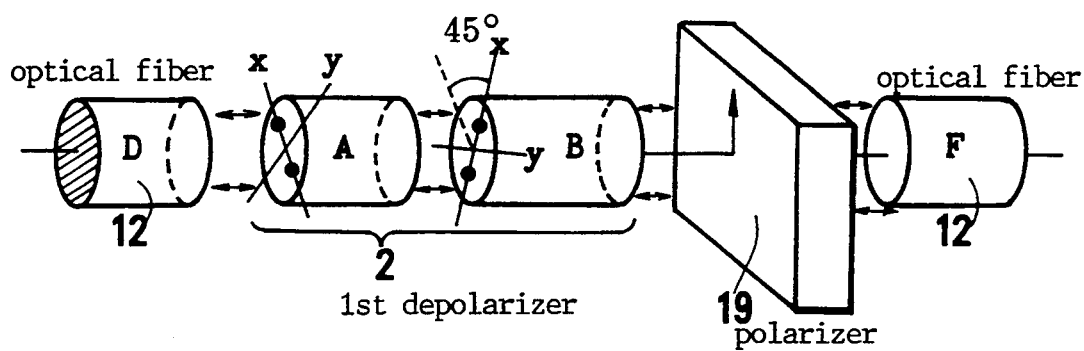
FIG. 3 is a schematic view of a conventional depolarizer positioned in front of a polarizer (a perspective view demonstrating junctions between a polarization maintaining fiber, a single mode fiber and a polarizer).

The first depolarizer (2) is not an ordinary one as shown in FIG. 3 in which a first polarization maintaining fiber (A) is coupled to a second polarization maintaining fiber (B) at a 45 degree inclination angle. The first depolarizer (2) is otherwise built of a polarization maintaining fiber (A) coupled directly to a front end of a polarizer (19) with the principal axis inclining all 45 degrees to the axis of the polarizer. Another end of the fiber (A) is osculated to an end of an ordinary single mode fiber (D) of the second fiber path (12). Namely, the depolarizer spares one polarization maintaining fiber in comparison to the one shown in FIG. 3. This dispenses with a fiber (B). Number of junctions is also reduced by one. The function of the fiber (B) is assigned to the optical axis of the polarizer. Thus substitution of the optical axis to a fiber (B) allows us to save one fiber (B). As mentioned before, a polarization maintaining fiber (birefringent material) can work as a depolarizer in cooperation with an axis of a polarizer.

As clearly explained so far, a depolarizer in an intermediate position requires a polarization maintaining fibers (A) and (B) with optical principal axes twisting by 45 degrees. However, when a single polarization maintaining fiber (A) is directly coupled to a polarizer, the beam with a polarization plane perpendicular to the axis of the polarizer totally vanishes. There is no necessity for separating such a beam from the beam with a polarization plane parallel with the axis of the polarizer, then another polarization maintaining fiber (B) can be omitted.

Figure 2:
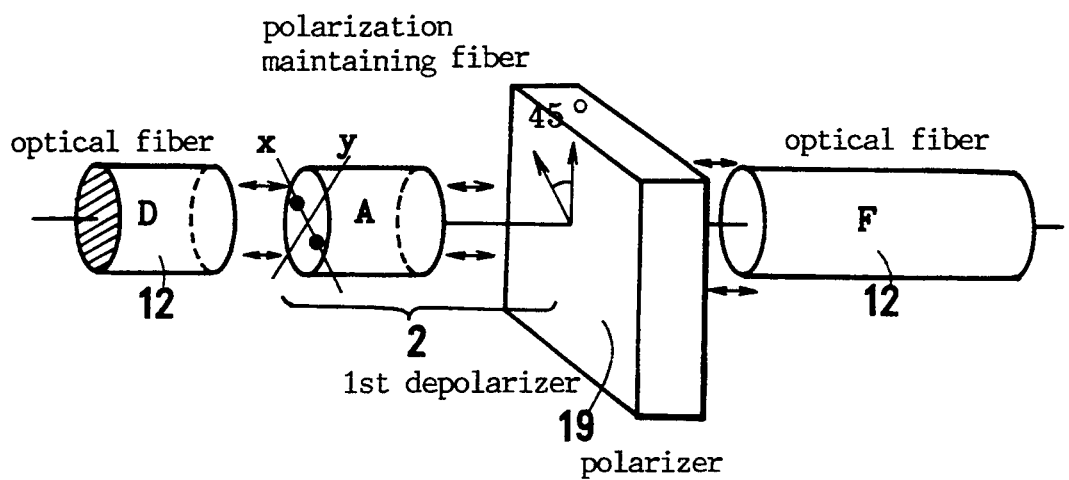
FIG. 2 is an enlarged, schematic, perspective view of a depolarizer constructed by a polarization maintaining fiber directly coupled to a front end of a polarizer.

The function of the device shown in FIG. 2 will be explained. In FIG. 2, when a beam with an arbitrary polarization plane enters a polarization maintaining fiber (A), it is divided into two beams, one of which has X-polarization and the other has Y-polarization. The ratio of division is $\cos \Phi$ to $\sin \Phi$. As two partial beams spread in the fiber (A), the phase difference between the beams is increasing. The final difference at the end of the fiber (A) is longer than the coherent length of the light. Therefore, these light beams do not interfere each other. The beams enter the polarizer (19) with X-polarization (principal axis of the polarizer). The intensities of the beams are in proportion to $\cos \Phi \sin 45°$ and $\sin \Phi \cos 45°$, since the principal axes of the fiber (A) twist at 45° to the axis of the polarizer. As the beams do not interfere, the power of beams is given by a sum of the squares of the amplitudes of the two. The power $H_x$ is $$H_x = (\cos^2 \Phi + \sin^2 \Phi)/2 = \tfrac{1}{2} \qquad (9)$$

This equation means that half of initial power can pass through the polarizer (19) irrespective of the initial polarization. This device can heighten the stability of light power of the beams which pass through it from the fiber (A). The role of the device furnishing with a depolarizer and a polarizer is to convert the beam emitted from the source to a beam having energy exactly half of the initial one and having a polarization parallel with the axis of the polarizer.

Then a beam which is going to enter the polarizer from the side of the fiber coil will be now considered. The beam has been converted to a beam with polarization parallel with the axis of the polarizer. When the beam enters the polarization maintaining fiber (A), the beam will be divided exactly into halves in energy to a beam of X-polarization and to a beam of Y-polarization, because the axes of the fiber incline at 45° to that of the polarizer (19). Accordingly, the beam becomes depolarized after it has passed through the fiber (A). The depolarized beam enters a photodetector which will measure the intensity of an interference beam of the clockwise propagated beam and counterclockwise propagated beam. Rotation of polarization between the polarizer and the photodetector induces no fluctuation of a scale factor which is a ratio of the output signal to the angular velocity of the fiber coil. This invention heightens the stability of the power of the beams passing through the polarizer. Enhancement of the stability of power of beams can stabilize the scale factor, which is one of the most important requirements of fiber-optic gyroscopes.

As mentioned before, the inventions devised by the Inventors;

(1) Japanese patent application NO. 2-225616 (225616/90)

(2) Japanese patent application NO. 2-225617 (225617/90)

(3) Japanese patent application NO. 2-225618 (225618/90) have pointed out the importance of the first depolarizer i.e. a depolarizer between a light source and a polarizer. Accidentally, these inventions inserted a first depolarizer between a first fiber coupler and a light source. Since the depolarizer was far separated from the polarizer, these inventions did not allow us to improve a depolarizer to be a coupling of a birefringent material and a polarizer. However, a first depolarizer should be interposed between a light source and a polarizer in order to stabilize the power of the light beam which has passed therethrough. Therefore, a first depolarizer can be interposed between the fiber coupler and the polarizer, which enabled them to devise this invention.

Essential parts of this invention have been explained so far. Hereafter, common parts which have been known to the skilled will be explained. The fiber coil (4) is made by winding many times a single mode fiber in a coil. This invention is able to be applied to a phase modulating type, a frequency modulating type and phase shift type of fiber-optic gyroscopes. Embodiments are examples of a phase modulating type which is equipped with a phase modulator (5).

The phase modulator (5) is produced by winding a part of the single mode fiber near an end of the fiber coil (4) around a cylindrical piezoelectric oscillator with electrodes for deforming it. When alternating current (AC) voltage is applied to the electrodes, the piezoelectric oscillator dilates or shrinks in radial direction by the frequency of the alternating current voltage. Mechanical dilation and shrinkage of the oscillator induce expansion and shrinkage of the fiber wound thereby. The oscillation of the length of the fiber changes the phase of the beam passing the fiber. As the phase modulator is disposed at an end of the fiber coil (4), a CW beam and CCW beam receive phase modulation at a different timing. Thus, the effect of the phase modulation appears in the output of the photodetector (6). The photodetector is e.g. a pin photodiode. It makes a CW beam and a CCW beam interfer and measures the intensity of the interference beam.

A first fiber coupler (7) and a second fiber coupler (8) are produced by peeling coatings of parts of fibers, contacting the peeled parts together on sides, melting, gluing them and expanding the molten, coupled fibers. Short distance between the cores of two fibers allows them to couple together by evanescent waves which transmit light power by the tail of the wave functions permeating from the cores. A fiber coupler has four ends of two pairs. When a beam is introduced into an end of a pair, it will be divide into halves and two beams with equal power will go out of two ends of the other pair. The length of the expansion is adjusted in order to equalize the output power of the ends. A fiber coupler is not so bulky as a beam splitter. It is a compact and convenient device for division and coupling of beams.

Then fiber paths will be now explained. A first fiber path (11) connects the light source (1) and the first fiber coupler (7). This is an ordinary single mode fiber. A convergent device (10) (e.g. lenses) intervenes between the light source (1) and an end of the Fiber. A second fiber path (12) connects the first fiber coupler (7) to the second fiber coupler (8). A third fiber path (13) and a fourth fiber path (14) are ends of the Fiber coil (4). Both ends communicate with the second fiber coupler (8).

A fifth fiber coupler (15) connects the first fiber coupler (7) to the photodetector (6). A sixth fiber path (16) is a remainder of the second fiber coupler (8) with a free end. A seventh fiber path (17) is a remainder of the first fiber coupler (7) with a free end.

The polarizer (19) is installed in midway of the second fiber path (12) connecting the first coupler (7) to the second coupler (8). The phase modulator (5) and the second depolarizer (3) are installed either the third fiber path (13) or the fourth fiber path (14). This example has the depolarizer (3) and the phase modulator (5) mounted in different paths. But they can of course be mounted in the same path of (13) or (14).

The first depolarizer (2) is disposed between the first fiber coupler (7) and the polarizer (19) of the second path (12). A linearly-polarized beam emitted from the light source is depolarized by the first depolarizer (2). The depolarized beam is linearly polarized to a certain direction at the polarizer (19). Since the beam is once depolarized, the amplitude of the beam having passed through the polarizer (19) is constant irrespectively of the direction of the light source or the direction of the polarization of the incident beam. The constant amplitude of the output beam dispenses with the adjustment of directions of the light source (1) and the polarizer (19). Even if external forces, change of temperature or magnetic fields induce rotation of polarization planes, the rotation will not influence upon the output beam of the polarizer (19).

EMBODIMENT ②

Figure 4:
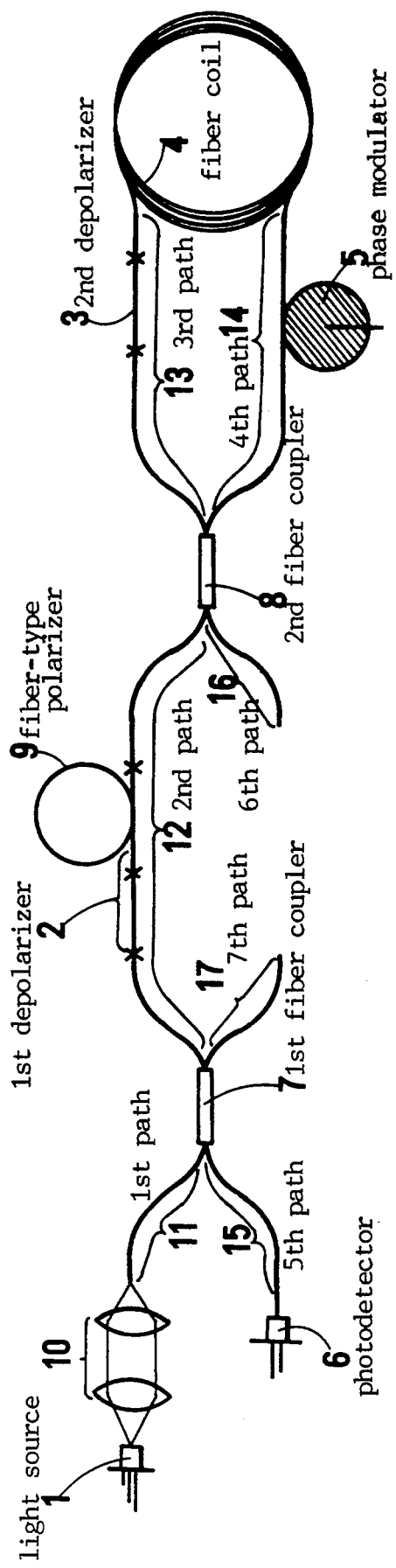
FIG. 4 is a schematic view of a first invention of a fiber-optic gyroscope with a fiber-type polarizer.

FIG. 4 demonstrates another embodiment of the first invention. A polarization maintaining fiber is coupled to a front end of a fiber-type polarizer (9). All of the optical paths are constructed by fibers including a polarizer. Main portion is made of an ordinary single mode fiber, but a part is constructed by a polarization maintaining fiber. This fiber-optic gyroscope comprises a light source (1), a first depolarizer (2), a second depolarizer (3), a fiber coil (4), a phase modulator (5), a photodetector (6), a first fiber coupler (7), a second fiber coupler (8), and a fiber-type polarizer (9). All parts are connected by fibers.

The fiber-type polarizer (9) is produced by winding a polarization maintaining fiber in a coil around a bobbin. Two modes of different polarization planes can be propagated in a polarization maintaining fiber. But one mode having a polarization plane parallel with the coil plane attenuates in a coiled fiber. Thus, the other mode can pass through the coiled fiber without attenuation. The coiled polarization maintaining fiber acts as a polarizer. The first depolarizer (2) which is disposed before the polarizer can be simplified according to the idea of this invention.

Figure 5:
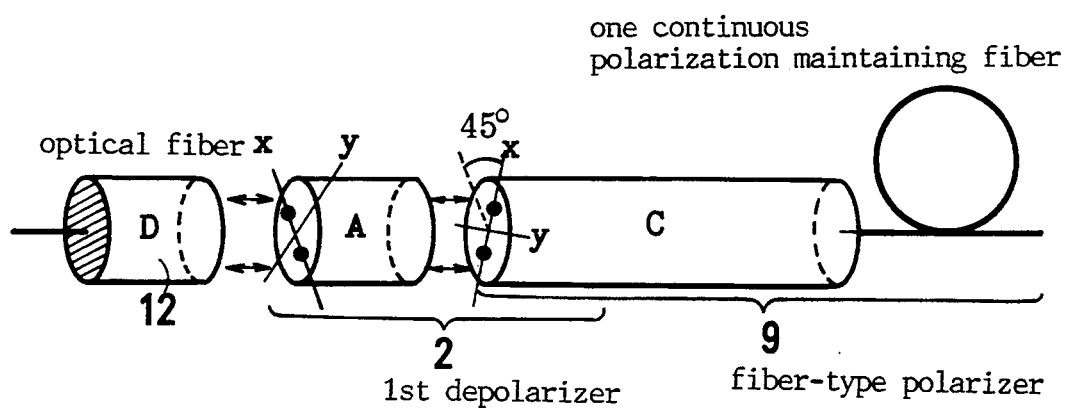
FIG. 5 is a schematic view of a vicinity of a depolarizer consisting of a polarization maintaining fiber coupled directly to a front end of a fiber-type polarizer.
Figure 6:
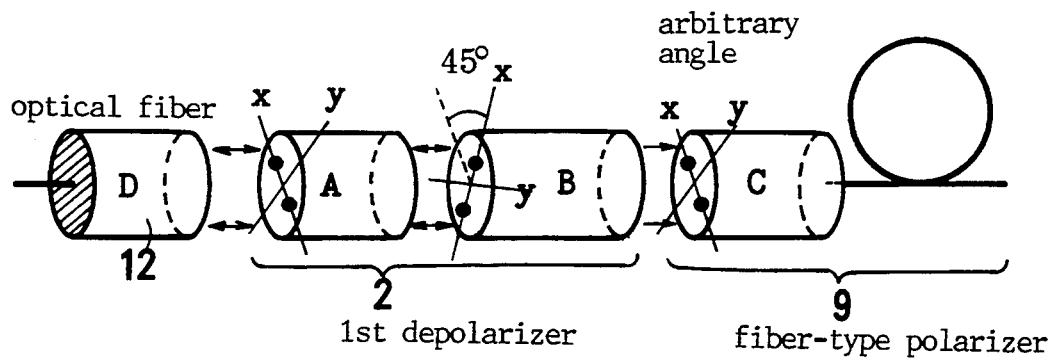
FIG. 6 is a schematic view of a conventional depolarizer consisting of two polarization maintaining fibers positioned directly in front of a fiber-type polarizer.

The first depolarizer (2) is not built of two polarization maintaining fibers (A) and (B) as shown in FIG. 6, but made by one polarization maintaining fiber (A) as demonstrated in FIG. 5. Namely, a polarization maintaining fiber (A) is spliced to an end of the polarization maintaining fiber (C) of the fiber-type polarizer (9) with optical axes of (A) inclining at 45° to the optical axes of (C). A substantial depolarizer can be constructed by the assembly. Other parts are similar to embodiment ①.

EMBODIMENT ③

FIG. 7 shows an embodiment of the second invention. A second depolarizer (3) is not disposed at an end of the fiber coil (4) but is positioned between a polarizer (19) and a second fiber coupler (8). The second depolarizer (3) is constructed by one polarization maintaining fiber and the polarizer (19) which are connected together with an inclination angle of 45° between the axes of the former and the axes of the latter.

Figure 8:
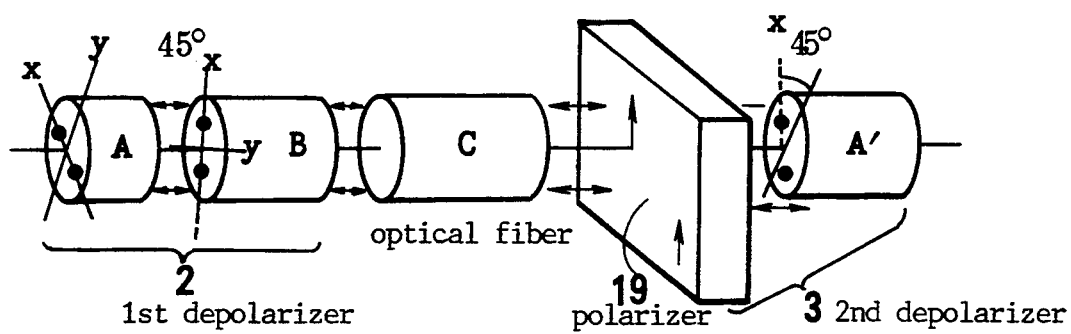
FIG. 8 is a schematic, disassembled view of a vicinity of a depolarizer consisting of a polarization maintaining fiber directly coupled to a rear end of a polarizer.

A polarizer (19) can be one of the metal-dielectric multilayer, fiber-type one or polarization prism. In the example, the first depolarizer (2) is a conventional one having two polarization maintaining fibers spliced at a 45° inclination angle as demonstrated in FIG. 6. FIG. 8 shows the vicinity of the polarizer (19). Although these fibers have been spliced together in practice, parts are shown in a disassociated state in order to demonstrate clearly ends of the fibers spliced each other. The second depolarizer (3) consists of the polarizer (19) and one polarization maintaining fiber (A'). The depolarizer which had been positioned at the end of a fiber coil (4) in prior art is transferred to the vicinity of the polarizer (19). If the second depolarizer is not disposed near the polarizer (19), such a simplified form of depolarizer cannot be employed. This disposition of a depolarizer allows a CW beam and a CCW beam to be depolarized at the same time. A deliberation teaches us that there is no necessity a second depolarizer should be positioned between a second coupler (8) and a coil (4).

EMBODIMENT ④

Figure 10:
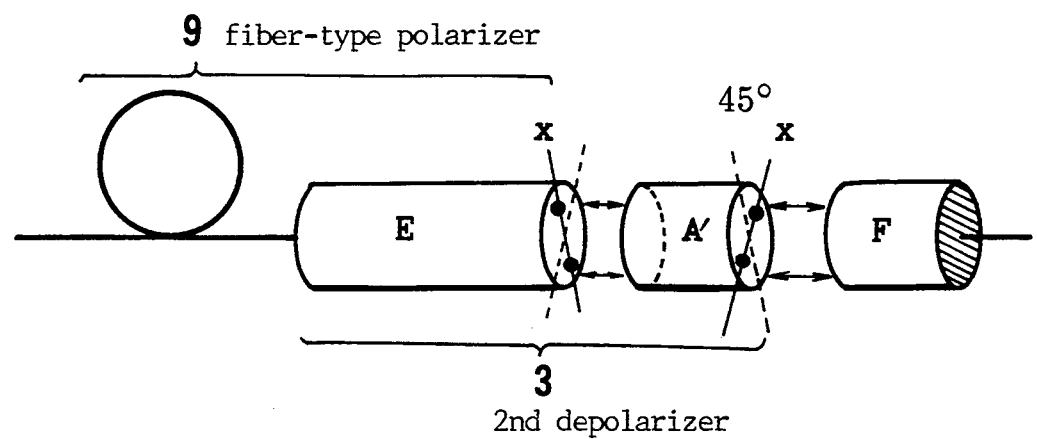
FIG. 10 is a view of a vicinity of a depolarizer consisting of a polarization maintaining fiber coupled to a rear end of a fiber-type polarizer.

FIG. 9 demonstrates another embodiment of the second invention. Similarly to embodiment 3, a simplified, assembled depolarizer (3) accompanies a polarizer (9). However, a fiber-type polarizer (9) is employed. Thus all of the paths are constructed by fibers like embodiment ②. FIG. 10 is an enlarged view of the depolarizer. One polarization maintaining fiber (A') adheres to an end of polarization maintaining fiber (E) of the polarizer (9) with the axes inclining at 45° together. (F) is a single mode fiber of the second fiber path (12).

EMBODIMENT ⑤

Figure 11:
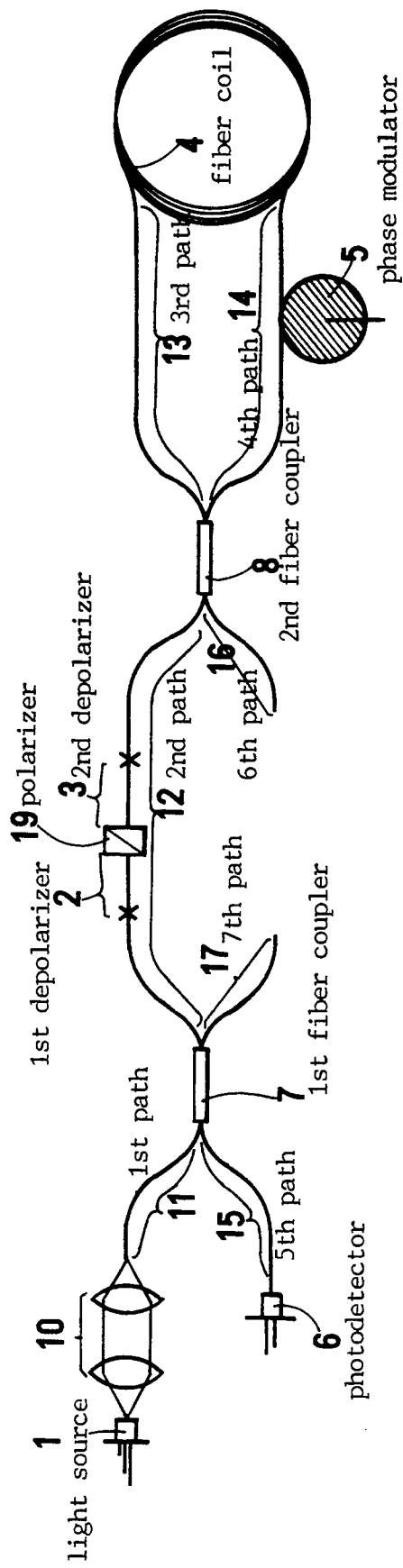
FIG. 11 is a schematic view of a fiber-optic gyroscope as an embodiment of a third invention.

FIG. 11 shows an embodiment of the third invention. Both a first and a second depolarizers (2) and (3) are produced in a simplified form directly coupled to a polarizer (19). A polarizer can be arbitrary one chosen from a metal-dielectric multilayer, a fiber-type one, or a polarization prism. Disposition of depolarizers is symmetric with regard to the polarizer (19). Number of the junctions is reduced by two in comparison to prior art.

Figure 12:
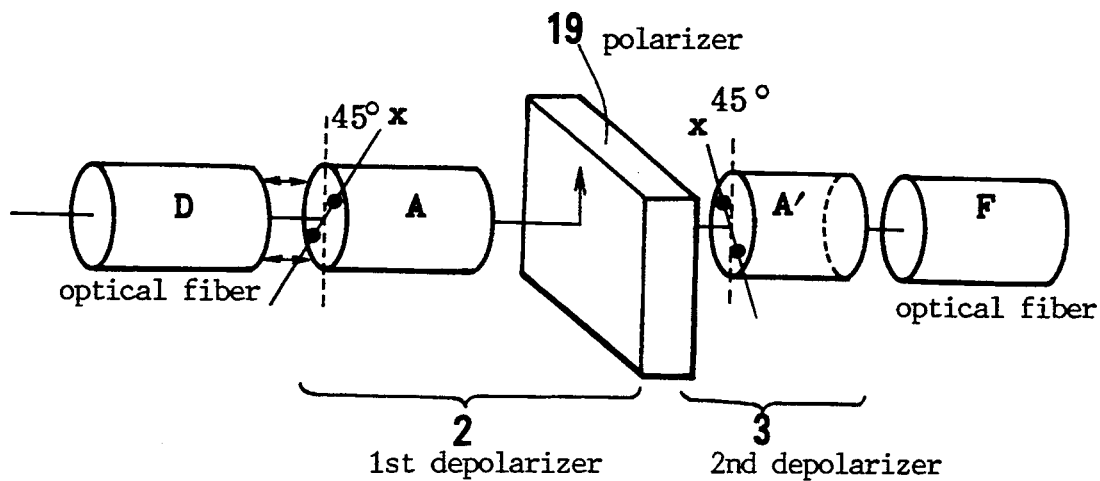
FIG. 12 is a disassembled view of a vicinity of depolarizers consisting of two polarization maintaining fibers coupled to both ends of a polarizer.

FIG. 12 demonstrates an enlarged view of the depolarizers. One polarization maintaining fiber (A) adheres at a 45° inclination angle of principal axes to a front end of the polarizer (19). The fiber (A) and the polarizer (19) form a substantial depolarizer (2). Another polarization maintaining fiber (A') is spliced at a 45° inclination angle of principal axes to a rear end of the polarizer (19). Embodiment (5) simplifies both depolarizers (2) and (3) according to the fundamental idea of this invention.

EMBODIMENT (6)

Figure 14:
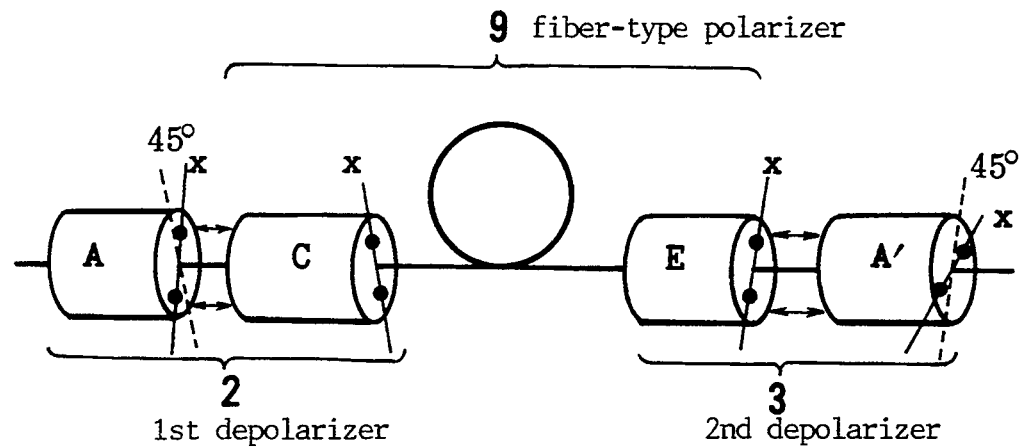
FIG. 14 is a disassembled view of a vicinity of depolarizers consisting of two polarization maintaining fibers coupled to both ends of a fiber-type polarizer as an example of the ones shown in FIG. 13.
Figure 13:
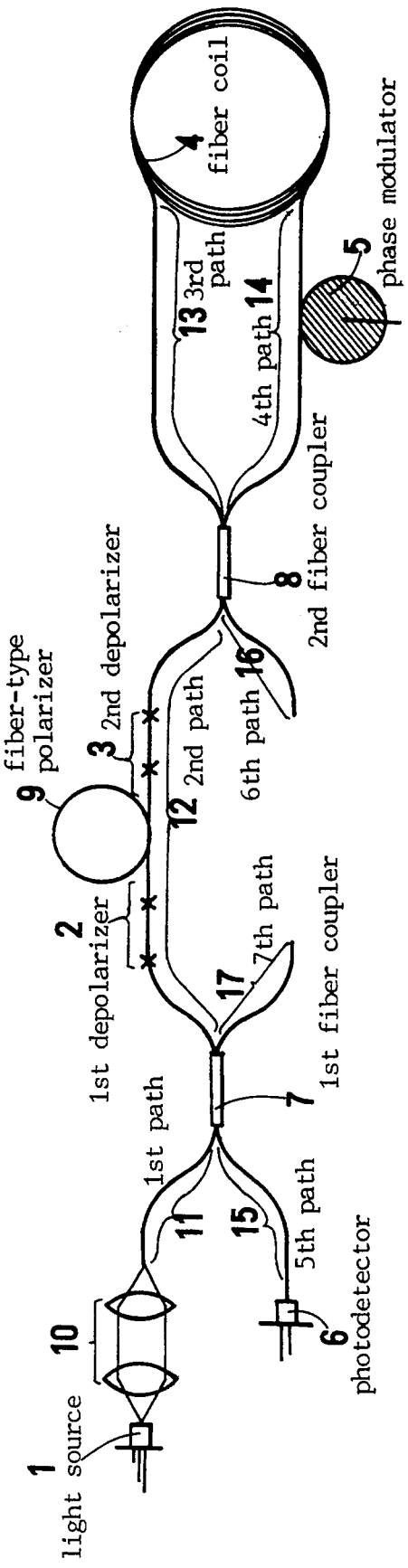
FIG. 13 is a schematic view of a fiber-optic gyroscope utilizing a fiber-type polarizer as an embodiment of the third invention.

FIG. 13 shows another example of the third invention. A fiber-type polarizer (9) is employed as a polarizer (19). FIG. 14 demonstrates depolarizers and a polarizer (9) in embodiment (6). A first depolarizer (2) is formed by a polarization maintaining fiber (A) spliced at a 45° inclination angle to a front end (C) of the fiber-type polarizer (9). A second depolarizer (3) is constructed by a polarization maintaining fiber (A') at a 45° inclination angle to the rear end (E) of the same polarizer (9).

What we claim is;

1. A fiber-optic gyroscope for measuring an angular velocity of a fiber coil by propagating light beams clockwise and counterclockwise in the fiber coil, detecting an intensity of an interference beam, and calculating a phase difference between a clockwise propagated beam and a counterclockwise propagated beam, comprising a light source for emitting a quasi-monochromatic light beam, the fiber coil of a single mode fiber wound in many turns, a photodetector for detecting an intensity of the interference beam, a first fiber path communicating with the light source, a second fiber path, a third fiber path being an end of the fiber coil, a fourth fiber path being another end of the fiber coil, a fifth fiber path communicating with the photodetector, a first coupler for coupling the first and fifth fiber paths to the second fiber path, a second coupler for coupling the third and forth fiber paths to the second fiber path, a polarizer disposed in the second fiber path, a first depolarizer disposed in front of the polarizer in the second fiber path and a second depolarizer provided either in the third fiber path or the fourth fiber path between the fiber coil and the second coupler or in the second fiber between the polarizer and the second coupler, the first depolarizer being constructed by coupling a polarization maintaining fiber to a front end of the polarizer at an about 45 ° inclination angle between principal axes of the polarizer and the polarization maintaining fiber, the polarization maintaining fiber having a difference of optical paths between the beams with different principal axes being longer than a coherent length of the light source.

2. A fiber-optic gyroscope as claimed in claim (1), wherein the polarizer is a fiber-type polarizer being produced by winding a polarization maintaining fiber in a coil and vanishing a beam with a polarization plane in a direction by making use of dependence of a loss on the polarization.

3. A fiber-optic gyroscope as claimed in claim 1, wherein the polarizer is a metal-dielectric multilayer.

4. A fiber-optic gyroscope for measuring an angular velocity of a fiber coil by propagating light beams clockwise and counterclockwise in the fiber coil, detecting an interference beam, and calculating a phase difference between a clockwise propagated beam and a counterclockwise propagated beam, comprising a light source for emitting a quasi-monochromatic light beam, the fiber coil of a single mode fiber wound in many turns, a photodetector for detecting an intensity of the interference beam, a first fiber path communicating with the light source, a second fiber path, a third fiber path being an end of the fiber coil, a fourth fiber path being another end of the fiber coil, a fifth fiber path communicating with the photodetector, a first coupler for coupling the first and fifth fiber paths and to the second fiber path, a second coupler for coupling the third and fourth fiber paths and to the second fiber path, a polarizer disposed in the second fiber path, a first depolarizer disposed in front of the polarizer in the second fiber path, and a second depolarizer provided at a rear end of the polarizer, the second depolarizer being constructed by coupling a polarization maintaining fiber to a rear end of the polarizer at an about 45° inclination angle between principal axes of the polarizer and the polarization maintaining fiber, the polarization maintaining fiber having a difference of optical paths between the beams with different polarization planes parallel with different principal axes being longer than a coherent length of the light source.

5. A fiber-optic gyroscope as claimed in claim (4), wherein the polarizer is a fiber-type polarizer being produced by winding a polarization maintaining fiber in a coil and vanishing a beam with a polarization plane in a direction by making use of dependence of a loss on the polarization.

6. A fiber-optic gyroscope as claimed in claim (4), wherein the polarizer is a metal-dielectric multilayer consisting of many metal thin films and dielectric films deposited by turn on each other.

7. A fiber-optic gyroscope for measuring an angular velocity of a fiber coil by propagating light beams clockwise and counter-clockwise in the fiber coil, detecting an intensity of an interference beam, and calculating a phase difference between a clockwise propagated beam and a counterclockwise propagated beam, comprising a light source for emitting a quasi-monochromatic light beam, the fiber coil of a single mode fiber wound in many turns, a photodetector for detecting an intensity of the interference beam, a first fiber path communicating with the light source, a second fiber path, a third fiber path being an end of the fiber coil, a fourth fiber path being another end of the fiber coil, a fifth fiber path communicating with the photodetector, a first coupler for coupling the first and fifth fiber paths and to the second fiber path, a second coupler for coupling the third and fourth fiber paths to the second fiber path, a polarizer disposed in the second fiber path, a first depolarizer disposed in front of the polarizer in the second fiber path, and a second depolarizer disposed in a rear end of the polarizer in the second fiber path, the first depolarizer being constructed by coupling a polarization maintaining fiber to a front end of the polarizer at an about 45 ° inclination angle between principal axes of the polarizer and the polarization maintaining fiber, the polarization maintaining fiber having a difference of optical paths between the beams with different polarization planes parallel with different principal axes being longer than a coherent length of the light source.

8. A fiber-gyroscope as claimed in claim (7), wherein the polarizer is a fiber-type polarizer being produced by winding a polarization maintaining fiber in a coil and vanishing a beam with a polarization plane in a direction by making use of dependence of a loss on the polarization.

9. A fiber-optic gyroscope as claimed in claim (7), wherein the polarizer is a metal-dielectric multilayer consisting of many metal thin films and dielectric films deposited by turn on each other.

* * * * *